US008843434B2

(12) United States Patent
Attaran Rezaei et al.

(10) Patent No.: US 8,843,434 B2
(45) Date of Patent: Sep. 23, 2014

(54) METHODS AND APPARATUS FOR VISUALIZING, MANAGING, MONETIZING, AND PERSONALIZING KNOWLEDGE SEARCH RESULTS ON A USER INTERFACE

(75) Inventors: Behnam Attaran Rezaei, Los Angeles, CA (US); Alice Hwei-Yuan Meng Muntz, Pacific Palisades, CA (US)

(73) Assignee: Netseer, Inc., Mountain View, CA (US)

( * ) Notice: Subject to any disclaimer, the term of this patent is extended or adjusted under 35 U.S.C. 154(b) by 61 days.

(21) Appl. No.: 11/680,599

(22) Filed: Feb. 28, 2007

(65) Prior Publication Data

US 2007/0203903 A1    Aug. 30, 2007

Related U.S. Application Data

(60) Provisional application No. 60/778,013, filed on Feb. 28, 2006.

(51) Int. Cl.
*G06F 17/30* (2006.01)

(52) U.S. Cl.
CPC .... *G06F 17/30873* (2013.01); *G06F 17/30994* (2013.01); *Y10S 707/99932* (2013.01); *Y10S 707/99933* (2013.01); *Y10S 707/99934* (2013.01)
USPC ................. 707/5; 707/999.002; 707/999.003; 707/999.004

(58) Field of Classification Search
CPC .................... G06F 17/30675; G06F 17/30734; G06Q 10/00
USPC ............................................. 707/2, 3, 4, 5, 6
See application file for complete search history.

(56) References Cited

U.S. PATENT DOCUMENTS 5,581,764 A    12/1996    Fitzgerald et al.
5,721,910 A    2/1998    Unger et al.
(Continued)

FOREIGN PATENT DOCUMENTS

CN    101278257 A    10/2008
EP    1891509 A2    2/2008
(Continued)

OTHER PUBLICATIONS

Geroge T. Wang "Web Search with Personalization and Knowledge" 2002 Proceedings of the IEEE Fourth International Symposium on Multimedia Software Engineering (MSE'02).*

(Continued)

*Primary Examiner* — Hosain Alam
*Assistant Examiner* — Ahmed Abraham
(74) *Attorney, Agent, or Firm* — Nixon Peabody LLP

(57) ABSTRACT

Systems and methods are described that facilitate exploration and mining of a corpus of documents using concepts and knowledge, rather than keywords and enable interactive visualization, management, monetization, and personalization of knowledge search results on a user interface. Underlying documents can be mapped into overlapping clusters of knowledge dimensions and the documents can be further partitioned into narrower knowledge dimensions, resulting in a hierarchical structure. Content of knowledge dimensions may be filtered using a knowledge dimension map. Knowledge may be personalized by a user and shared in collaborative and social networks. Knowledge-based advertisement systems and methods are described that associate products and services with knowledge dimensions and concepts. Advertisers can bid on concepts and KDs. Systems and methods are described that distribute a percentage of CPC revenue among content owners and provide revenue to content providers based on relevancy scores.

29 Claims, 11 Drawing Sheets

(56) References Cited

U.S. PATENT DOCUMENTS

| | | | |
|---|---|---|---|
| 5,956,708 A | 9/1999 | Dyko et al. | |
| 6,038,560 A * | 3/2000 | Wical | 1/1 |
| 6,098,064 A | 8/2000 | Pirolli et al. | |
| 6,233,575 B1 | 5/2001 | Agrawal et al. | |
| 6,242,273 B1 | 6/2001 | Goodwin et al. | |
| 6,339,767 B1 | 1/2002 | Rivette et al. | |
| 6,397,682 B2 | 6/2002 | Kumar et al. | |
| 6,446,061 B1 | 9/2002 | Doerre et al. | |
| 6,544,357 B1 | 4/2003 | Hehmann et al. | |
| 6,549,896 B1 | 4/2003 | Candan et al. | |
| 6,665,837 B1 | 12/2003 | Dean et al. | |
| 6,816,884 B1 | 11/2004 | Summers | |
| 6,826,553 B1 | 11/2004 | DaCosta et al. | |
| 6,886,129 B1 | 4/2005 | Raghavan et al. | |
| 7,031,308 B2 | 4/2006 | Garcia-Luna-Aceves et al. | |
| 7,051,023 B2 | 5/2006 | Kapur et al. | |
| 7,092,953 B2 | 8/2006 | Haynes | |
| 7,181,438 B1 | 2/2007 | Szabo | |
| 7,269,253 B1 | 9/2007 | Wu et al. | |
| 7,483,711 B2 | 1/2009 | Burchfiel | |
| 7,590,589 B2 | 9/2009 | Hoffberg | |
| 7,613,851 B2 | 11/2009 | Rice et al. | |
| 7,660,855 B2 | 2/2010 | Arning et al. | |
| 7,680,796 B2 | 3/2010 | Yeh et al. | |
| 7,689,493 B1 | 3/2010 | Sullivan et al. | |
| 7,716,060 B2 | 5/2010 | Germeraad et al. | |
| 7,725,467 B2 | 5/2010 | Yamamoto et al. | |
| 7,725,475 B1 | 5/2010 | Alspector et al. | |
| 7,725,525 B2 | 5/2010 | Work | |
| 7,730,063 B2 * | 6/2010 | Eder | 707/736 |
| 7,805,536 B1 | 9/2010 | Kompella et al. | |
| 7,818,191 B2 | 10/2010 | Lutnick et al. | |
| 7,822,745 B2 | 10/2010 | Fayyad et al. | |
| 7,831,586 B2 | 11/2010 | Reitter et al. | |
| 7,885,987 B1 | 2/2011 | Lee | |
| 7,958,120 B2 | 6/2011 | Muntz et al. | |
| 7,984,029 B2 | 7/2011 | Alspector et al. | |
| 7,996,753 B1 | 8/2011 | Chan et al. | |
| 8,024,372 B2 | 9/2011 | Harik et al. | |
| 8,050,965 B2 | 11/2011 | Hellevik et al. | |
| 8,301,617 B2 | 10/2012 | Muntz et al. | |
| 8,370,362 B2 * | 2/2013 | Szabo | 707/739 |
| 8,380,721 B2 | 2/2013 | Attaran Rezaei et al. | |
| 8,412,575 B2 | 4/2013 | Labio et al. | |
| 8,417,695 B2 | 4/2013 | Zhong et al. | |
| 8,468,118 B2 | 6/2013 | Kim et al. | |
| 2001/0037324 A1 | 11/2001 | Agrawal et al. | |
| 2001/0049688 A1 * | 12/2001 | Fratkina et al. | 707/104.1 |
| 2002/0016782 A1 | 2/2002 | Cooper | |
| 2002/0049792 A1 * | 4/2002 | Wilcox et al. | 707/522 |
| 2002/0080180 A1 | 6/2002 | Mander et al. | |
| 2002/0087884 A1 | 7/2002 | Shacham et al. | |
| 2002/0091846 A1 | 7/2002 | Garcia-Luna-Aceves et al. | |
| 2002/0143742 A1 | 10/2002 | Nonomura et al. | |
| 2003/0046307 A1 | 3/2003 | Rivette et al. | |
| 2003/0115191 A1 * | 6/2003 | Copperman et al. | 707/3 |
| 2003/0187881 A1 | 10/2003 | Murata et al. | |
| 2003/0217139 A1 | 11/2003 | Burbeck et al. | |
| 2003/0217140 A1 | 11/2003 | Burbeck et al. | |
| 2003/0220866 A1 * | 11/2003 | Pisaris-Henderson et al. | 705/37 |
| 2003/0227479 A1 | 12/2003 | Mizrahi et al. | |
| 2004/0024739 A1 * | 2/2004 | Copperman et al. | 707/1 |
| 2004/0064438 A1 * | 4/2004 | Kostoff | 707/1 |
| 2004/0080524 A1 | 4/2004 | Yeh et al. | |
| 2004/0085797 A1 | 5/2004 | Mei et al. | |
| 2004/0093328 A1 * | 5/2004 | Damle | 707/3 |
| 2004/0122803 A1 | 6/2004 | Dom et al. | |
| 2004/0133555 A1 | 7/2004 | Toong et al. | |
| 2004/0170328 A1 * | 9/2004 | Ladwig et al. | 382/217 |
| 2004/0267638 A1 | 12/2004 | Giunta | |
| 2005/0010556 A1 | 1/2005 | Phelan | |
| 2005/0021461 A1 * | 1/2005 | Flake et al. | 705/40 |
| 2005/0021531 A1 | 1/2005 | Wen et al. | |
| 2005/0033742 A1 | 2/2005 | Kamvar et al. | |
| 2005/0055321 A1 * | 3/2005 | Fratkina et al. | 706/45 |
| 2005/0064618 A1 | 3/2005 | Brown et al. | |
| 2005/0065980 A1 | 3/2005 | Hyatt et al. | |
| 2005/0086260 A1 | 4/2005 | Canright et al. | |
| 2005/0097204 A1 | 5/2005 | Horowitz et al. | |
| 2005/0113691 A1 | 5/2005 | Liebschner | |
| 2005/0114198 A1 | 5/2005 | Koningstein et al. | |
| 2005/0114763 A1 | 5/2005 | Nonomura et al. | |
| 2005/0117593 A1 | 6/2005 | Shand | |
| 2005/0138070 A1 | 6/2005 | Huberman et al. | |
| 2005/0144065 A1 | 6/2005 | Calabria et al. | |
| 2005/0144162 A1 | 6/2005 | Liang | |
| 2005/0160107 A1 * | 7/2005 | Liang | 707/100 |
| 2005/0182755 A1 | 8/2005 | Tran | |
| 2005/0203838 A1 | 9/2005 | Zhang et al. | |
| 2005/0210008 A1 | 9/2005 | Tran et al. | |
| 2005/0210027 A1 | 9/2005 | Aggarwal et al. | |
| 2005/0222900 A1 | 10/2005 | Fuloria et al. | |
| 2005/0256905 A1 | 11/2005 | Gruhl et al. | |
| 2005/0256949 A1 | 11/2005 | Gruhl et al. | |
| 2005/0283461 A1 | 12/2005 | Sell et al. | |
| 2006/0004703 A1 | 1/2006 | Spivack et al. | |
| 2006/0041548 A1 * | 2/2006 | Parsons et al. | 707/5 |
| 2006/0047649 A1 | 3/2006 | Liang | |
| 2006/0080422 A1 | 4/2006 | Huberman et al. | |
| 2006/0085408 A1 | 4/2006 | Morsa | |
| 2006/0106793 A1 | 5/2006 | Liang | |
| 2006/0106847 A1 | 5/2006 | Eckardt, III et al. | |
| 2006/0112105 A1 | 5/2006 | Adamic et al. | |
| 2006/0112111 A1 | 5/2006 | Tseng et al. | |
| 2006/0168065 A1 | 7/2006 | Martin | |
| 2006/0171331 A1 | 8/2006 | Previdi et al. | |
| 2006/0184464 A1 | 8/2006 | Tseng et al. | |
| 2006/0209727 A1 | 9/2006 | Jennings, III et al. | |
| 2006/0212350 A1 | 9/2006 | Ellis et al. | |
| 2006/0218035 A1 | 9/2006 | Park et al. | |
| 2006/0235841 A1 | 10/2006 | Betz et al. | |
| 2006/0242017 A1 | 10/2006 | Libes et al. | |
| 2006/0271564 A1 | 11/2006 | Muntz et al. | |
| 2006/0294155 A1 * | 12/2006 | Patterson | 707/200 |
| 2007/0025364 A1 | 2/2007 | Kodialam et al. | |
| 2007/0033103 A1 | 2/2007 | Collins et al. | |
| 2007/0061300 A1 | 3/2007 | Ramer et al. | |
| 2007/0143329 A1 * | 6/2007 | Vigen | 707/101 |
| 2007/0174255 A1 | 7/2007 | Sravanapudi et al. | |
| 2007/0239534 A1 | 10/2007 | Liu et al. | |
| 2007/0245035 A1 | 10/2007 | Attaran Rezaei et al. | |
| 2007/0300152 A1 * | 12/2007 | Baugher | 715/522 |
| 2008/0033932 A1 | 2/2008 | DeLong et al. | |
| 2008/0065483 A1 | 3/2008 | Ball | |
| 2008/0086592 A1 | 4/2008 | Stephani | |
| 2008/0104061 A1 | 5/2008 | Rezaei | |
| 2008/0232809 A1 | 9/2008 | Beshai et al. | |
| 2008/0256061 A1 | 10/2008 | Chang et al. | |
| 2008/0301033 A1 | 12/2008 | Singh et al. | |
| 2009/0043648 A1 | 2/2009 | Mahdian et al. | |
| 2009/0046678 A1 | 2/2009 | Lee et al. | |
| 2009/0086663 A1 | 4/2009 | Ho et al. | |
| 2009/0157855 A1 | 6/2009 | Adam et al. | |
| 2009/0168768 A1 | 7/2009 | Chiabaut et al. | |
| 2009/0265475 A1 | 10/2009 | Fujita | |
| 2009/0281900 A1 | 11/2009 | Rezaei et al. | |
| 2009/0296719 A1 | 12/2009 | Maier et al. | |
| 2009/0300009 A1 | 12/2009 | Rezaei et al. | |
| 2011/0113032 A1 | 5/2011 | Boscolo et al. | |
| 2013/0046797 A1 | 2/2013 | Muntz et al. | |
| 2013/0046842 A1 | 2/2013 | Muntz et al. | |
| 2013/0198191 A1 | 8/2013 | Hernandez et al. | |
| 2014/0067535 A1 | 3/2014 | Rezaei et al. | |

FOREIGN PATENT DOCUMENTS

| | | |
|---|---|---|
| WO | 2006/121575 A2 | 11/2006 |
| WO | 2007/084616 A2 | 7/2007 |

(56) References Cited

FOREIGN PATENT DOCUMENTS

| | | |
|---|---|---|
| WO | 2007/084778 A2 | 7/2007 |
| WO | 2007/100923 A2 | 9/2007 |

OTHER PUBLICATIONS

Office Action in U.S. Appl. No. 11/923,546, mailed Aug. 2, 2010.
Office Action in U.S. Appl. No. 11/923,546, mailed Dec. 22, 2010.
Office Action in U.S. Appl. No. 11/923,546, mailed Jun. 3, 2011.
Office Action in U.S. Appl. No. 11/923,546, mailed Aug. 27, 2012.
Office Action in U.S. Appl. No. 11/923,546, mailed Jun. 6, 2013.
Office Action in U.S. Appl. No. 12/130,171, mailed Apr. 1, 2011.
Office Action in U.S. Appl. No. 12/130,171, mailed Oct. 19, 2011.
Office Action in U.S. Appl. No. 12/130,171, mailed Aug. 15, 2012.
Office Action in U.S. Appl. No. 12/130,171, mailed May 28, 2013.
Office Action in U.S. Appl. No. 12/436,748, mailed Sep. 16, 2011.
Office Action in U.S. Appl. No. 12/436,748, mailed May 2, 2012.
Office Action in U.S. Appl. No. 12/476,205, mailed Oct. 12, 2011.
Office Action in U.S. Appl. No. 12/476,205, mailed Jul. 3, 2012.
Office Action in U.S. Appl. No. 12/610,202, mailed May 22, 2012.
Notice of Allowance in U.S. Appl. No. 12/610,202, mailed Dec. 10, 2012.
Office Action in U.S. Appl. No. 12/906,051, mailed Mar. 13, 2012.
Office Action in U.S. Appl. No. 12/906,051, mailed Oct. 2, 2012.
U.S. Appl. No. 13/660,940, filed Oct. 25, 2012.
U.S. Appl. No. 14/017,123, filed Sep. 9, 2013.
Final Office Action in U.S. Appl. No. 11/625,279, mailed Oct. 3, 2013.
Office Action in U.S. Appl. No. 11/625,279, mailed Feb. 12, 2013.
Calado, P., et al., "Combining Link-Based and Content-Based Methods for Web Document Classifications," CIKM'03, pp. 394-401, ACM, 2003.
Chao, I. et al., "Tag Mechanisms Evaluated for Coordination in Open Multi-Agent Systems," ESAW 2007, LNAI 4995, Springer-Verlag Berlin Heidelberg, 2008, pp. 254-269.
Office Action in U.S. Appl. No. 13/660,940, mailed Jan. 6, 2014.
Weikum, G. et al., "Towards Self-Organizing Query Routing and Processing for Peer-to-Peer Web Search", DELIS-TR-0287, 2005, 19 pages.
Flake, G. W. et al., "Self-Organization and Identification of Web Communities," IEEE Computer Society, vol. 35, Issue 3, Mar. 2002, pp. 1-7.
Franceschetti M. et. al., "Navigation in Small World Networks, a Scale-Free Continuum Model," Jul. 2003, pp. 1-9.
Franceschetti et. al., "Closing the Gap in the Capacity of Wireless Networks Via Percolation Theory," Oct. 26, 2004, IEEE, pp. 1009-1018.
Japanese Office Action in Application No. 2008-511129 dated Jul. 26, 2011.
Sarshar, N. et al., "Scalable Percolation Search in Power Law Networks," Jun. 2004, Department of Electrical Engineering, University of California, Los Angeles, pp. 1-13.
Office Action in U.S. Appl. No. 13/660,955, mailed Jan. 8, 2014.
Kong et al., "Collaborative Spam Filtering Using E-Mail Networks", Aug. 2006, IEEE, pp. 67-73.
International Search Report for PCT Application No. PCT/US07/05504 dated Jul. 29, 2008.
Bagrow, J. P. et al., "A Local Method for Detecting Communities," Physical Review E, vol. 72, No. 4, 2005, 046108, pp. 1-16.
Bollobas, B., "Random Graphs," Second Edition, Cambridge University Press, United Kingdom, 2001, Chapter 1 and 2, pp. 1-59.
Boscolo, R., et al., "Functionality Encoded in Topology? Discovering Macroscopic Regulatory Modules from Large-Scale Protein-DNA Interaction Networks," Reprint arXiv:q-bio/0501039, Jan. 2005.
Chung, F. et. al., "The Small World Phenomenon in Hybrid Power Law Graphs," Lect. Notes Phys., vol. 650, 2004, pp. 89-104.
Clauset, A. et al., "Finding Community Structure in Very Large Networks," Physical Review, vol. 70, No. 6, Dec. 2004, 066111.
Erdos, P. et al., "On the Evolution of Random Graphs," Publication of the Mathematical Institute of the Hungarian Academy of Sciences, vol. 5, 1960, pp. 343-347.
Erdos, P. et al., "On the Strength of Connectedness of a Random Graph," Acta Mathematica Scientia Hungarica, vol. 12, No. 1-2, 1961, pp. 261-267.
Garton, L., et al., "Studying On-Line Social Networks," Doing Internet Research, Edited by S. Jones, Thousand Oaks, Calif., 1999, pp. 75-105.
Girvan, M. at al., "Community Structure in Social and Biological Networks," PNAS, vol. 99, No. 12, Jun. 2002, pp. 1-8.
Golbeck, "Accuracy of Metrics for Inferring Trust and Reputation in Semantic Web-based Social Networks," Apr. 2004, pp. 1-11.
Gonzalez-Barahona, J. M. et al., "Community Structure of Modules in the Apache Project," MSR '05: Proceedings of the 2005 International Workshop on Mining Software Repositories, 2005, 5 pages.
Kernighan, B. W. et al., "An Efficient Heuristic Procedure for Partitioning Graphs," The Bell System Technical Journal 49, Feb. 1970, pp. 291-307.
Kini et. al., "Fast and efficient randomized flooding on lattice sensor networks", Nov. 19, 2004, Drexel University, pp. 1-33.
Lyons, R. et al., "Probability on Trees and Networks," Apr. 17, 2005, pp. 1-45.
Manku, G. S. et. al., "Know thy Neighbor's Neighbor: the Power of Lookahead in Randomized P2P Networks," STOC'04, Jun. 2004, pp. 1-10.
Newman, M. E. J., "Coauthorship Networks and Patterns of Scientific Collaboration," PNAS, vol. 101, Apr. 2004, pp. 5200-5205.
Newman, M. E. J., "Fast Algorithm for Detecting Community Structure in Networks," Physical Review E 69, Jun. 2004, pp. 066133.1-066133.5.
Newman, M.E.J. et al. "Finding and Evaluating Community Structure in Networks," Physical Review E, vol. 69, 026113, 2004, pp. 1-16.
Owczarek, A. L. et. al., "Generalised Percolation Probabilities for the Self-Dual Potts Model," J. Phys. A: Math. Gen. 20, Apr. 1987, pp. 5263-5271.
Page, L. et al."The PageRank Citation Ranking: Bringing Order to the Web," Technical Report, Stanford InfoLab, 1999, pp. 1-17.
Patch, K., "Simple search lightens Net load," TRN, Sep. 2004, pp. 1-3.
Pons, P. et al., "Computing Communities in Large Networks Using Random Walks," ArXiv Condensed Matter e-prints, Dec. 2004, 20 pages.
Pothen, A. et al., "Partitioning Sparse Matrices with Eigenvectors of Graphs," Society of Industrial and Applied Mathematics, SIAM Journal on Matrix Analysis and Applications, vol. 11, No. 3, Jul. 1990, pp. 430-452.
Radicchi, F. et al., "Defining and Identifying Communities in Networks," PNAS, vol. 101, No. 9, Mar. 2004, pp. 2658-2663.
Rives, A. W. et al., "Modular Organization of Cellular Networks," PNAS, vol. 100, No. 3, Feb. 2003, pp. 1128-1133.
Scott, J. "Social Network Analysis: A Handbook," 2nd Edition, Sage Publications, London, 2000, Chapter 4, pp. 63-81.
Wasserman, S., "Social Network Analysis: Methods and Applications," Cambridge University Press, Cambridge, England, 1994, pp. 17-20 and Chapter 7, pp. 249-290.
Wellman, B. et al., "Computer Networks as Social Networks: Collaborative Work, Telework, and Virtual Community," Annual Reviews Sociology, vol. 22, No. 1, 1996, pp. 213-238.
Wu, F. et al., "Finding Communities in Linear Time: a Physics Approach," The European Physical Journal B, vol. 38, No. 2, 2004, pp. 331-338.
Zachary, W. W. "An Information Flow Model for Conflict and Fission in Small Groups," Journal of Anthropological Research, vol. 33, No. 4, Winter, 1977, pp. 452-473.
Chinese First Office Action in Chinese Patent Application No. 200680025190.6, dated Sep. 11, 2009.
Chinese Second Office Action in Chinese Patent Application No. 200680025190.6, dated Jun. 3, 2010.
International Search Report and Written Opinion for PCT Application No. PCT/US2006/14160, mailed Sep. 4, 2007.

(56) References Cited

OTHER PUBLICATIONS

International Search Report and Written Opinion for PCT Application No. PCT/US2007/001335, mailed Feb. 12, 2008.
International Search Report and Written Opinion for PCT Application No. PCT/US2007/001694, mailed Feb. 14, 2008.
Office Action in U.S. Appl. No. 11/125,329, mailed Mar. 30, 2010.
Office Action in U.S. Appl. No. 11/125,329, mailed Jun. 24, 2009.
Notice of Allowance in U.S. Appl. No. 11/125,329, mailed Feb. 2, 2011.
Notice of Allowance in U.S. Appl. No. 13/098,870, mailed Jun. 28, 2012.
Office Action in U.S. Appl. No. 11/624,674, mailed Mar. 15, 2010.
Office Action in U.S. Appl. No. 11/624,674, mailed Sep. 21, 2010.
Office Action in U.S. Appl. No. 11/624,674, mailed Dec. 20, 2011.
Notice of Allowance in U.S. Appl. No. 11/624,674, mailed Oct. 12, 2012.
Office Action in U.S. Appl. No. 11/625,279, mailed Mar. 18, 2009.
Office Action in U.S. Appl. No. 11/625,279, mailed Dec. 8, 2009.
Office Action in U.S. Appl. No. 11/625,279, mailed Oct. 25, 2010.
Office Action in U.S. Appl. No. 11/625,279, mailed May 13, 2010.
Office Action in U.S. Appl. No. 11/625,279, mailed Sep. 16, 2011.
Office Action in U.S. Appl. No. 11/625,279, mailed Apr. 17, 2012.
Office Action in U.S. Appl. No. 11/923,546, mailed Feb. 26, 2010.
Jiang, et al., "Monotone Percolation and the Topology Control of Wireless Networks", California Institute of Technology, Electrical Engineering Dept, 0-7803-8968-9/05, 2005, pp. 327-338.
Newman, et al., "Scaling and percolation in the small-world network model", Sante Fe Institute, May 6, 1999, pp. 1-12.
Newman, M.E.J., "Random Graphs as Models of Networks", SFI Working Paper: 2002-02-005, 2002, pp. 1-36.
Silverberg, et al., "A Percolation Model of Innovation in Complex Technology Spaces", Sep. 2002, MERIT-Infonomics Research Memorandum Series, pp. 1-24.
Zou et al., "Email Virus Propagation Modeling and Analysis", Univ. Of Mass., Dept. Of Electrical and Computer Engineering, Dept of Computer Science, 2004, TR-CSE-03-04, pp. 1-17.
Notice of Allowance in U.S. Appl. No. 13/660,940, mailed Jun. 13, 2014.
Notice of Allowance in U.S. Appl. No. 13/660,955, mailed Jun. 16, 2014.

* cited by examiner

Prior Art Search Process

METHODS AND APPARATUS FOR VISUALIZING, MANAGING, MONETIZING, AND PERSONALIZING KNOWLEDGE SEARCH RESULTS ON A USER INTERFACE

CROSS-REFERENCE TO RELATED APPLICATIONS

The present application claims benefit of priority from U.S. Provisional Patent Application Ser. No. 60/778,013, titled "Methods and Apparatus for Visualizing, Managing, Monetizing, and Personalizing Knowledge Search Results on a User Interface" and filed Feb. 28, 2006, the contents of which are incorporated herein by reference and for all purposes. The present Application is also related to U.S. Non-Provisional patent application Ser. No. 11/624,674, titled "System and Method for Context-based knowledge Search, Tagging, Collaboration, Management, and Advertisement" and filed Jan. 18, 2007 and U.S. Non-Provisional patent application Ser. No. 11/625,279, titled "Systems and Methods for Creating, Navigating and Searching Informational Web Neighborhoods" and filed Jan. 19, 2007, which applications are hereby incorporated herein by reference.

BACKGROUND OF THE INVENTION

1. Field of the Invention

The present invention relates generally to data processing of documents and more particularly to searching and retrieving of information and knowledge, and synchronizing search results with advertisers' products and services, in particular to methods and systems for formulating query, user relevancy feedback, managing results, personalization of knowledge, and monetization of content and knowledge.

2. Description of Related Art

Today's major World Wide Web (the "Web") search engines, such as those provided by Google and Yahoo, crawl the Web and index billions of Web pages maintained in their respective repositories. Rudimentary processing of the information inherent in these ultra-large and substantially unstructured datasets has already led to the creation of a multi-billion dollar industry. The underlying model is deceptively simple: (i) content creators from around the globe publish their content on the web and link them to other contents via hyperlinks. In fact, the web, having at first grown in an organic and voluntary fashion, has now become almost the first choice as a publication medium: it is the norm now to publish one's content on the web first, and often, in preference to any other communication media; (ii) users search this repository for information required for their everyday decision making process, the number of users and searches having increased exponentially since the inception of the web; and (iii) advertisers pitch their products and services as the users browse and search for information. There is, however, a growing realization in the industry that in order for this model to continue to work and the industry to keep growing, the three primary stakeholders, namely the users of the web, the advertisers, the content owners, have to be served better.

Users can experience variety of problems using current search technologies. Searching information is an imprecise process, where users frequently often do not have a clear vision of their goals, may have only a fuzzy understanding of what they want, recognizing it only when they see it. The facility to search is generally limited to keyword and Boolean functions of these keywords. Keywords and their Boolean functions are notoriously inefficient in capturing user intent.

FIG. 1 depicts a conventional search engine-user interaction process. Conventional search engines are much more data-oriented (i.e., keyword-oriented). Usually, they return as hits, a linear list of documents embedded with the keywords entered by the user. One can also use sophisticated Boolean functions of these keywords as search criteria. Typically, these search systems present a long disorganized list of several hundred thousands, or millions of documents listed according to the underlying search systems' global ranking algorithm and the "proximity" score, that determines—sometimes arbitrarily—relevance of the keywords entered by the user in relation to a document under consideration. Most users do not understand Boolean expressions, Boolean models, and how to express their search requests in terms of Boolean expressions. A majority of the Boolean expressions constructed by users consist of a sequence of keywords. As a result, the long and disorganized list of documents returned frequently fails to directly address users' information needs.

In conventional search engines, the primary criterion of using Page Rank for determining if a document is relevant has been known to have serious deficiencies. For example, if the SONY Corporation's home page (which has a high page rank) adds only one piece of information about heart-disease, then this document will be displayed very high on a list returned responsive to a search for "heart disease," even though this is a very isolated document and is probably not very relevant, given Sony's business models. Thus, sorting via page rank can often lose the context of the documents.

Conventional search engines often require users to spend a large amount of time reformulating their search expressions to satisfy their information needs: these conventional web search engines contain an underlying assumption that users' information needs are static. However, users' information needs, and subsequently their search expressions, continuously change and often take new and unexpected directions upon assimilation of the information retrieved throughout the search process. Often, the original goal of the search may be only partially fulfilled. In addition, users' information needs are generally not satisfied by a single, final retrieval of a set of documents, but rather by a series of selections and bits of information found along the way.

Furthermore, conventional search engines require separate, and often manual processing by users that generally includes scanning result information, viewing lists of titles, reading the titles in result sets, reading the retrieved documents themselves, scanning thesaurus structures, manually constructing lists of topics related to query terms, documenting separately additional keywords associated with topics of interests, and following hypertext links within the documents related to search results. Users repeat these steps until, by chance, the users' query expression matches the search engines' underlying page ranking schemes such that the "keyword-relevant" result set corresponds to the "user-relevant information." A lot of times users lose track of the path taken from initial query to reach the desired information. When the same search is subsequently initiated, there is no guarantee that the same search process can be reproduced to achieve the information goal.

Advertisers are directly affected by the problems experienced by users of conventional search engines. The current dominant practice associates keywords to products and services. Thus companies end up buying hundreds of thousands of keywords so that the keywords will cover all the meanings and intent with which users may be searching the web, and then the companies spend millions of dollars to analyze the keyword return on investment (ROI). Keyword based advertisement creates unusual problems: for example, a Google™ search for the word "virus" returns a preponderance of pages related to computer viruses leading related software companies to bid heavily for the keyword "virus." This leaves no room for sellers of drugs for viral infections produced by pharmaceutical companies. Thus, software producers and pharmaceutical companies are forced to compete with each other although no overlap in their respective sectors is apparent. Therefore, keyword based advertisement does not reach intended potential customers, and severely limits Internet ad-billboard space.

In conventional revenue generation systems for search engines, a user performs a search and the search results are displayed along with advertisements that match keywords used in the search. If the user then clicks on an advertisement, the search engine provider receives a share of the revenue paid by the advertiser according to the cost-per-click (CPC) model. The basic premise underlying this model is that the user was satisfied with the quality and information content of the documents returned by the search results. While a search engine can sort and organize a given set of documents, it neither creates nor controls the quality of information in the documents. Thus, content owners who make high-quality searches possible are excluded from the revenue sharing equation.

BRIEF SUMMARY OF THE INVENTION

Certain embodiments of the present invention resolve many of the issues associated with conventional search technologies and provide a new paradigm for users, advertisers and content providers. In certain embodiments, exploration and mining of a corpus of documents can be performed using concepts and knowledge rather than keywords.

In certain embodiments, systems and methods are provided for interactive visualization, management, monetization, and personalization of knowledge search results on a user interface. An underlying set of documents can be mapped into overlapping clusters of knowledge dimensions. The corpus of documents associated with each knowledge dimension can be closely linked by explicit structural links that may be defined by content creators and by semantic links that are derived from analyses of the contents of the corpus of documents. In certain embodiments, each knowledge dimension can be associated with a unique identifier and can be characterized by a set of concepts that best describe the documents in the knowledge dimension. An additional overall concept can be provided as a label or identifier for the knowledge dimension and represented as a pattern of words or terms.

In certain embodiments, the corpus of documents of a knowledge dimension can be further partitioned into narrower knowledge dimensions, resulting in a hierarchical structure. Concepts may belong to multiple categories, including predefined concepts, organic concepts and/or statistical concepts. Relevancy scores can be assigned or calculated for documents, concepts and other components of a knowledge dimension; relevancy scores may be quantified with respect to the knowledge dimension and other components of documents associated with the knowledge dimension. Content of each knowledge dimension may be selected or filtered using a knowledge dimension map In certain embodiments, knowledge may be personalized, created, modified and deleted by a user. Knowledge, including personalized knowledge may be shared in collaborative and social networks. A user can publish knowledge dimensions to such networks and specify different levels of access to different groups in a social network. Personalized navigation histories may be maintained and aggregated for individual users and histories may be aggregated with histories of other users for sharing among a social network or work group.

Certain embodiments provide knowledge-based advertisement capabilities including systems and methods that associate products and services with knowledge dimensions and concepts that are inherent in knowledge search systems. Advertisers can bid for concepts and KDs that more accurately describe and characterize their products and services than keywords. Existing feeds can be used to generate a list of concepts and KDs that best match the advertised products and services.

Certain embodiments provide improved systems and methods of monetization content based on relevance to a selected advertisement. Systems and methods are provided for sharing revenue among content owners responsible for a user's selection of a particular advertisement. Systems and methods are provided that distribute a certain percentage of the CPC revenue among all content owners having documents displayed at time of advertisement selection and based on relevancy scores.

BRIEF DESCRIPTION OF THE DRAWINGS

FIG. 5 illustrates an example of a knowledge dimension map.

FIG. 6 illustrates an example of certain functions available to users of a knowledge search system prior to system login.

FIG. 19 illustrates an example of similarity search.

FIG. 20 illustrates an example of a positioning interface used to analyze a company's product, service, technology, and marketing positions.

DETAILED DESCRIPTION OF THE INVENTION

Figure 1:
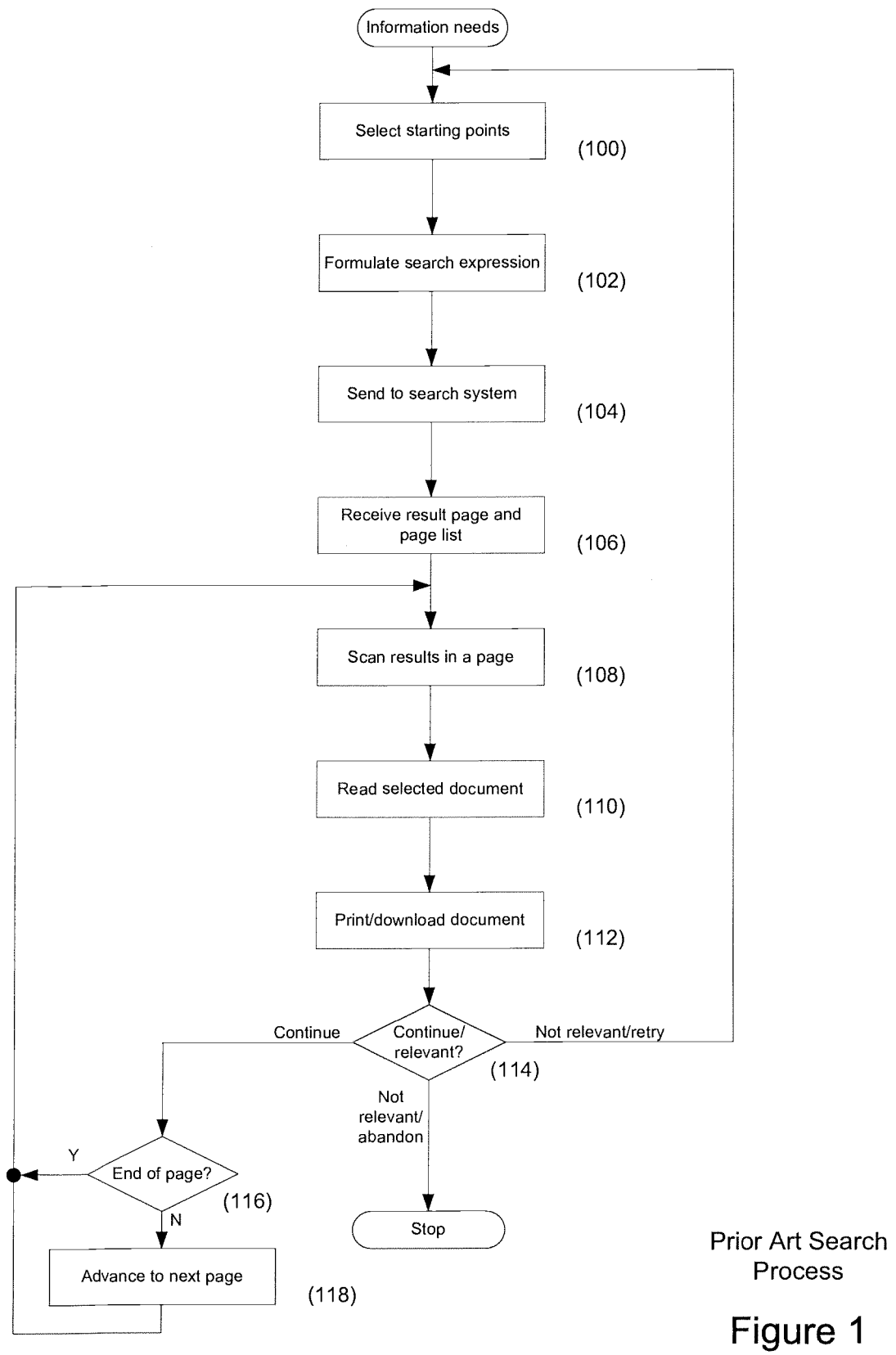
FIG. 1 illustrates a conventional web search process.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods for organizing a corpus of documents in terms of concepts and knowledge that they represent. In one example, the documents are provided through the World Wide Web. Certain embodiments provide systems and methods for creating, navigating, and searching informational Web neighborhoods and for context-based knowledge searching, tagging, collaborating, managing and advertising. Underlying knowledge search systems permit organization of the web and/or any corpus of documents in terms of concepts that tie documents and other objects together. In certain embodiments, an underlying document set can be mapped into overlapping clusters of knowledge dimensions ("KDs"). Combinations of documents can be closely linked within a corpus of documents that is associated with a KD. Links can be expressed as explicit structural links that are defined by the content creators and/or through semantic links derived from analyses of the contents of the corpus of documents. In the example of the Web, structural links may include URLs.

In certain embodiments, combinations of linked documents share at least one common concept that has a minimum predetermined relevance to each of the linked documents. A combination of documents may be created from documents having a shared concept that has the highest relevance for each document in the combination. In some embodiments, the predetermined relevance may be expressed as percentile such that links can be formed based on concepts that fall within a top percentage of concepts identified in the documents. For example, the top percentage may be selected to comprise documents having relevance ranked in the top 5%, top 25%, the top 50% of documents under consideration. By determining relevance of more than one concept, rapid convergence on a desired set of results can be accomplished. In the example of a query directed to viruses, the consideration of a Virus concept and a Disease concept can be expected to produce a more relevant set of results for biological viruses because documents associated with computer viruses will typically be assigned significantly lower relevance because of the general inapplicability of the Disease concept.

Typically, a KD is assigned or associated with a unique identifier, and can be maintained as a global object in the context of a corpus of documents under consideration. A KD can be further characterized by a set of concepts that best describe the documents in a KD and by an overall concept performing the function of a label or an identifier for the KD. In certain embodiments, a concept may include a pattern of words or terms. A corpus of documents associated with a KD can be further partitioned into one or more knowledge sub-dimensions ("sub-KDs") such that a hierarchical structure is obtained. Furthermore, a sub-KD may be further organized by identifying sub-dimensions of the sub-KD to obtain sub-sub-KDs, and so on.

Certain systems and methods employed in certain embodiments for the conceptual ordering and exploring of the Web and other content include are described in related U.S. Non-Provisional patent application Ser. No. 11/624,674 and related U.S. Non-Provisional patent application Ser. No. 11/625,279.

In certain embodiments, systems and methods comprise a user interface for visualizing informational communities that include one or more sets of documents sharing a common set of concepts and information. The user interface may enable visualization of information relevancy and can facilitate understanding and expression of information needs of a user. In certain embodiments, user feedback related to relevancy may be obtained interactively in order to improve search effectiveness, improve query generation and to improve methods for processing queries and generating concepts. Successful search expressions used in a user search process can be recorded for future reuse and information derived from search results can be managed consistently.

Certain embodiments provide systems and methods for interactive visualization, management, monetization, and personalization of knowledge and search results. In one example, an underlying document set can be mapped into overlapping clusters of KDs. A corpus of documents associated with a KD can be closely linked together via explicit structural links that are defined by content creators such as hyperlinks. The corpus of documents can be linked via semantic links that are derived from analyses of the contents of the corpus of documents. A KD is typically associated with one or more unique identifiers and may be characterized by a set of concepts that best describe the documents in a KD. An overall concept can act as a label or an identifier for the KD. A concept can be provided as a pattern of words or terms.

Visualization, Research and Navigation of Knowledge Search Systems

Figure 2:
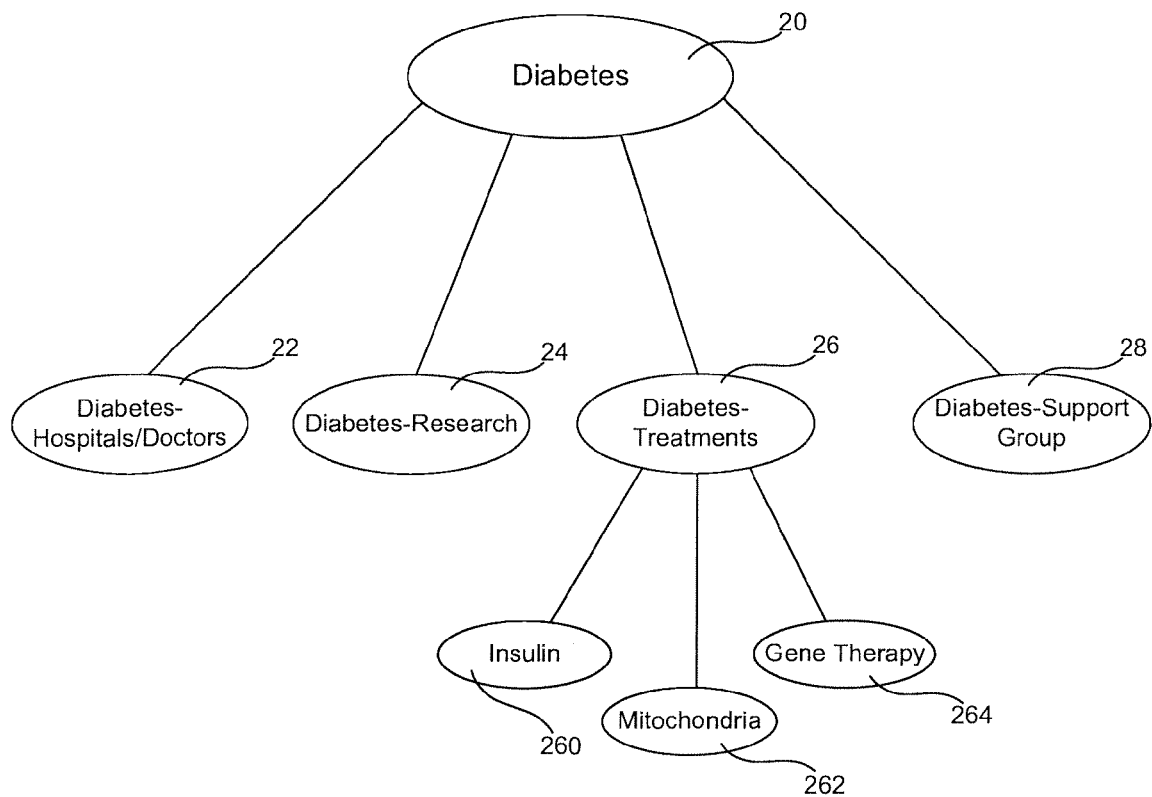
FIG. 2 illustrates an example of hierarchical knowledge dimensions according to certain aspects of the invention.

FIG. 2 provides an illustrative example in which a KD labeled "Diabetes" 20 may comprise documents containing information about the diabetes disease. The Diabetes KD 10 can be subdivided into sub-KDs including a "Diabetes-Hospitals/Doctors" sub-KD 22, a "Diabetes-Research" sub-KD 24, a "Diabetes-Treatments" sub-KD 26 and a "Diabetes-Support-Group" sub-KD 28. Furthermore, the concepts in the Diabetes-Treatments sub-KD 26 can include concepts such as an "Insulin" sub-KD 260, a "Mitochondria" sub-KD 262, a "Gene Therapy" sub-KD 264 and so on. While some KDs such as the Diabetes KD 20 may exhibit a very modular and well-defined concept, other KDs may correspond to a very high-level and broad concept. For example, in the provision of public services in Los Angeles, a KD may comprise sub-KDs corresponding to different types of services provided by the city of Los Angeles, as well as, city, state, and federal agencies that are responsible for providing such services.

In certain embodiments, a KD may include concepts that belong to multiple categories and these concepts can include predefined concepts such as names of diseases, organizations, companies and authors. A KD can also include organic/statistical concepts such as patterns of words that appear in documents associated with a KD much more frequently than would be expected for a randomly constructed corpus of the same size.

In certain embodiments, documents, concepts, and sub-KDs within a KD can be assigned relevancy scores with respect to the KD and with respect to the entire corpus of the documents. Thus, an "Insulin" concept may have a very high relevancy score in the Diabetes-Treatments sub-KD 26 and a relatively low relevancy score in the Diabetes-Hospitals/Doctors sub-KD 22. Similarly, a document describing recent research results on the production of Insulin using genetic engineering might have the highest score in the Diabetes-Research sub-KD 24.

In certain embodiments, the content of each KD may be selected or filtered via a knowledge dimension map ("KDM") which represents selected sub-KDs and concepts associated with a KD.

In certain embodiments, systems and methods are provided for interactive visualization, research and navigation of a knowledge search system comprising query formulation and parsing, navigation, concept and sub-KD filtering and category filtering. Query formulation and parsing is typically provided to facilitate various user queries of the search system including queries by concept, by KDM and by similarity. In one example, the user presents a document as an input and the search system returns KDs that are closest to a given document.

In certain embodiments, search results are displayed as a sorted list of KDs that best match the query, where the display can include a summary set of significant concepts, KDM and documents for each KD. For each concept provided in the query, relevancy scores can be determined in the context of a plurality of KDs and these relevancy scores can be used to determine the order in which the KDs are displayed. For each KD, the relevancy scores can also be used to determine the order in which the KD's concepts, documents, and sub-knowledge dimensions are displayed. For example, a document can be ranked using its global score (e.g., of its page rank), its relevancy within a KD, and the relevancy of related concepts within the document including concepts matching those provided in the query. A weighted combination of these individual scores can be used to generate a final score. The relative roles of the different scores can then be adjusted and tuned to reflect the needs of the users.

Certain embodiments permit a user to navigate search results in terms of KDs and sub-KDs. The user can select a KD in the search result, and choose a sub-KD within the selected KD. The system can then show all significant documents, concepts, and sub-sub-KDs that comprise the selected sub-KD.

In certain embodiments, systems and methods for concept and sub-KD filtering are provided such that documents in a selected KD and sub-KD can be filtered by updating the KDM. In one example the KDM may be updated by selecting and highlighting particular concepts in the documents in order to filter the search results. In the example depicted in FIG. 2, a user can choose the Insulin and Mitochondria concepts in the Diabetes Research sub-KD 24 by highlighting, clicking or otherwise selecting desired text, icons, links, etc., thereby causing documents and sub-KDs where these concepts have high relevancy scores to be boosted and the concepts related to these documents to be emphasized.

In certain embodiments, systems and methods for filtering by category are provided. Documents in a KD can be filtered using predefined categories, such as products and services, image, video, news, web sites/html. In one example, a user may employ a temporal filter that causes documents to be sorted by their corresponding time-stamps such that the most recent items will be boosted and displayed first. The user may also use a location filter, whereby the document can be selected with respect to a physical location designated by presence in or proximity to one or more of a country, a state, a county, a city, an address, a map reference, GPS coordinate, cell tower and any other locator. In another example, a user may select news in a KD to cause associated news items will be displayed.

Certain embodiments of the invention provide a knowledge research system that comprises systems and methods for query formulation and query parsing. In one example, a user may query the search system by concept, by knowledge dimension map, and by similarity. The user can submit one or more documents as input to a search system which returns KDs that are closest in relevance to the submitted document. In certain embodiments a query can be processed to find a match between the concepts of the query and one or more concepts already present in a plurality of KDs in the underlying system. For example, a search for "Low Power," may cause a query processor to attempt to match the phrase "Low power" to a list of concepts and, if "Low Power" is identified as a concept, then all KDs associated with this concept can be returned as hits. Typically, the KDs and their constituent documents can be ranked based on combinations of factors including a global score and the relevance of the concept "Low Power" to the KDs as well as corresponding constituent documents. In another example, a query including the term "Low Power Mobile Computing" may cause a query parser to look for one or more concepts in the system that best match combinations of these words. For example, if "Low Power" and "Mobile Computing" are concepts, then the search result may return KDs that are strong in both the concepts.

Figure 3:
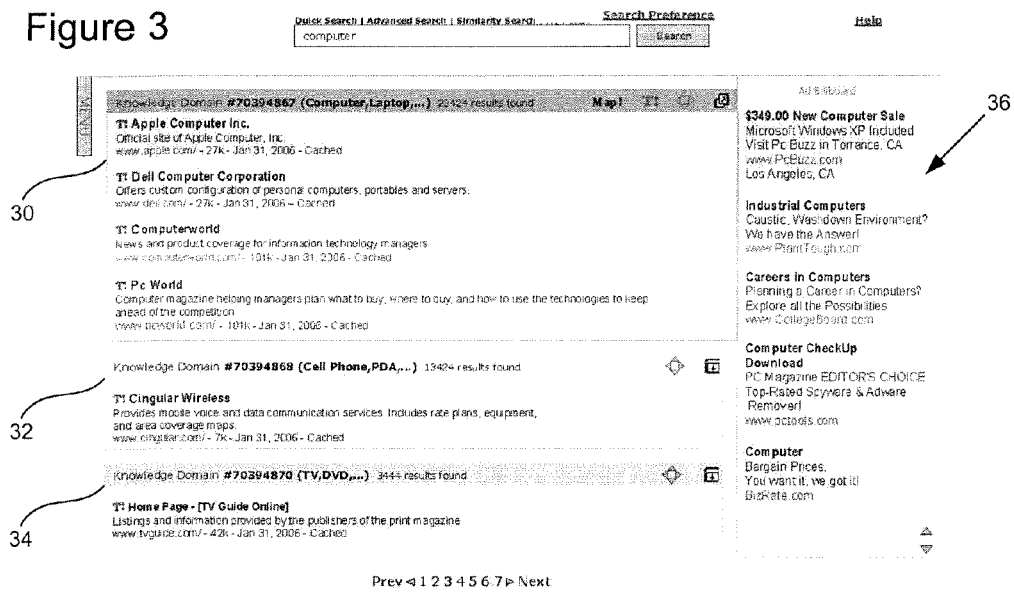
FIG. 3 illustrates an example of knowledge search results.
Figure 4:
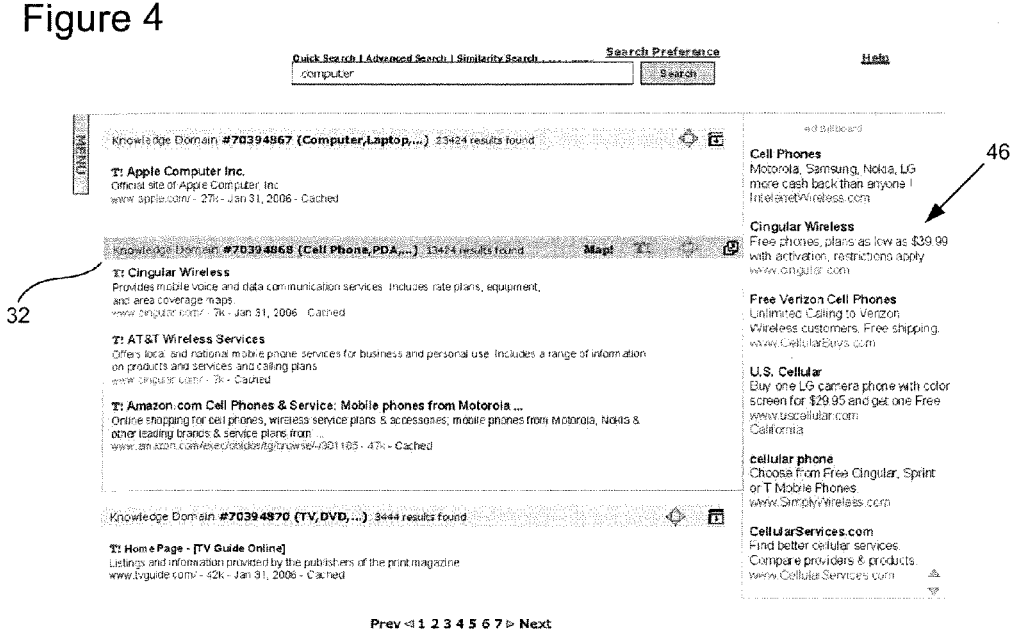
FIG. 4 illustrates an example of Ad-Billboard content synchronized with a knowledge dimension.
Figures 5, 6:
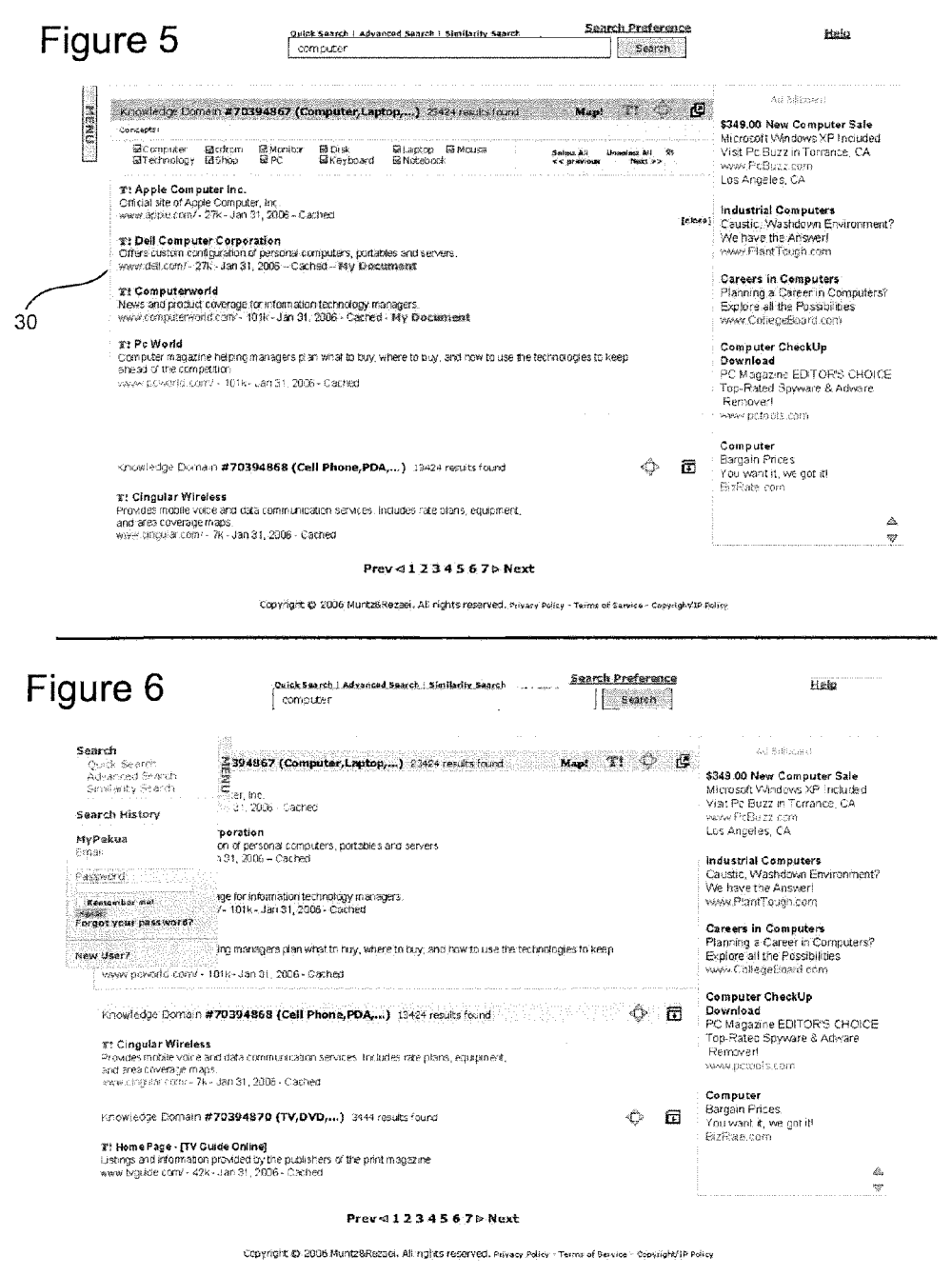

FIGS. 3-6 show an embodiment of a user interface with some of the abovementioned features. FIG. 3 depicts search results returned to a query for the term "Computer." The results are organized by the different Knowledge Dimensions. The top three KDs 30, 32 and 34 correspond to different aspects of the concept "computer": the first KD 30 corresponds to PCs and laptops, the second KD 32 relates to computers in PDA's and handhelds, and the third KD 34 relates to computers in the context of TV and DVD etc. The ad-billboard 36 corresponds to the top-most KD dealing with PCs and laptops. FIG. 4 illustrates a scenario wherein the second KD 32 of FIG. 3 is selected together with its documents. The advertisement billboard 46 is typically updated to reflect the user's expressed interest in a different category. Consequently, the updated ad-billboard 46 shows products and services related to PDAs and cell phones. FIG. 5 illustrates details of the top KD 30, along with related concepts, which can be selected individually to explore documents in the KD further. FIG. 6 illustrates an option to perform advanced search and to log in to the search engine site so that some of the personalization features, described next can be utilized.

Personalization of Search Results

In certain embodiments knowledge that is discovered through navigation and research of the knowledge search system can be personalized. A user may tag documents, concepts, knowledge dimensions, or knowledge dimension maps while navigating the knowledge search system. A user may create new KDs for personal use by tagging a set of documents, previously existing KDs, and concepts. These personal KDs can subsequently be updated, edited, and/or deleted. In some embodiments, a user can publish personal KDs to a social and collaborative network and the user may provide different levels of access to the different groups in his social network. Thus, collaborators within a research group may have access to all of the user's KDs and associated documents while subscribers or members excluded from the group may have limited access to portions of the knowledge hierarchy created by the user. The user may insert a tag or personal KDs into the content of his documents. When a viewer clicks on an embedded tag or KD in the document, the appropriate knowledge search system will typically be accessed to return search results.

In certain embodiments, personal and personalized content may be managed by users. Documents associated with, generated or maintained by, and/or personal to a user may be included in the user's personal KDs. The user may define personal concepts based on a repository of documents associated with the user, typically gathered as a history of prior searches. Upon login of a user, the knowledge search system may search or query a general system shared by all users and the documents included in the user KD and the user's repository of documents.

Figure 7:
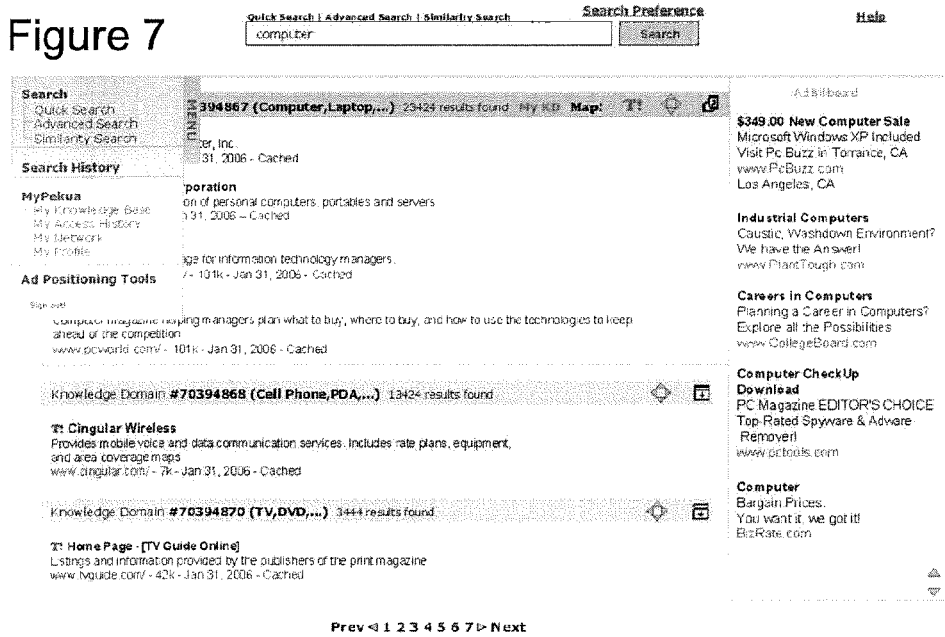
FIG. 7 illustrates an example of certain additional functions available to users of a knowledge search system after system login.
Figure 8:
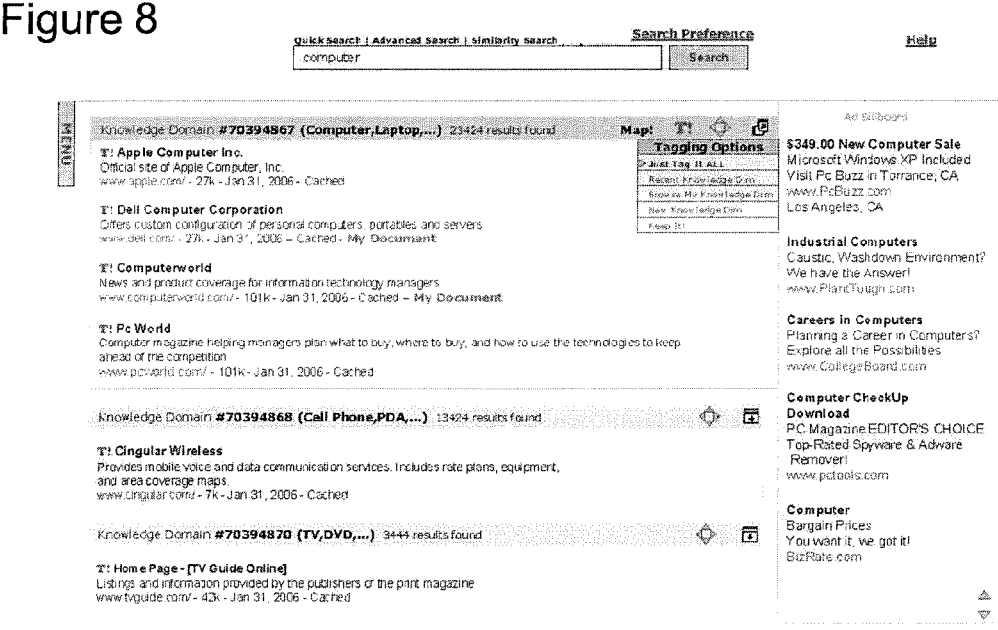
FIGS. 8-11 illustrate an example of a process of tagging a knowledge dimension, browsing previously tagged knowledge dimensions, and managing a personalized knowledge base.
Figure 9:
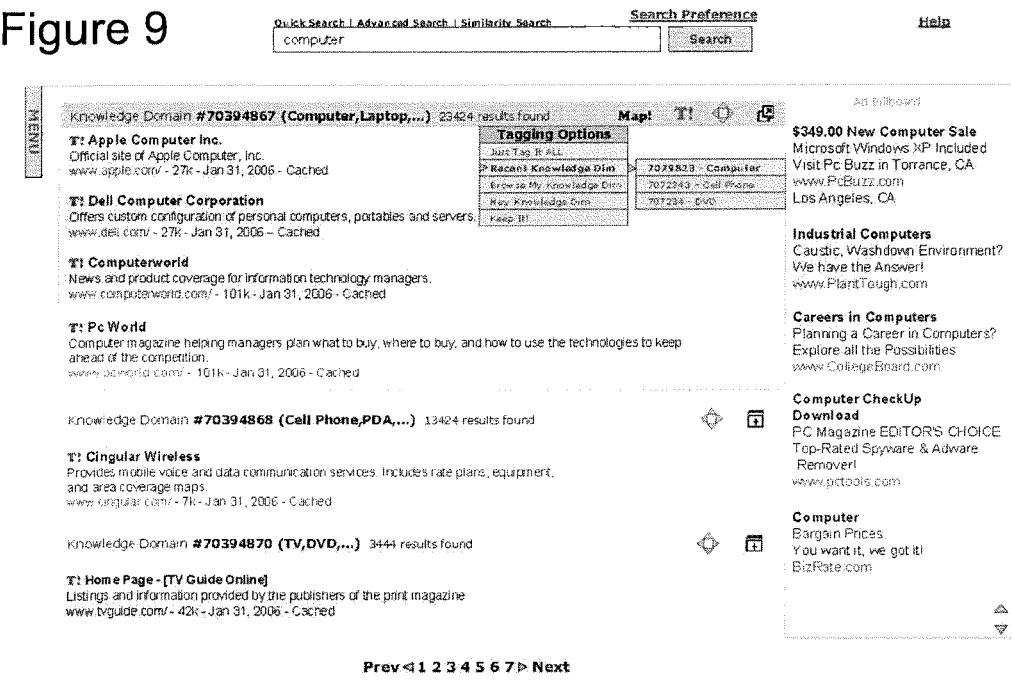
Figure 10:
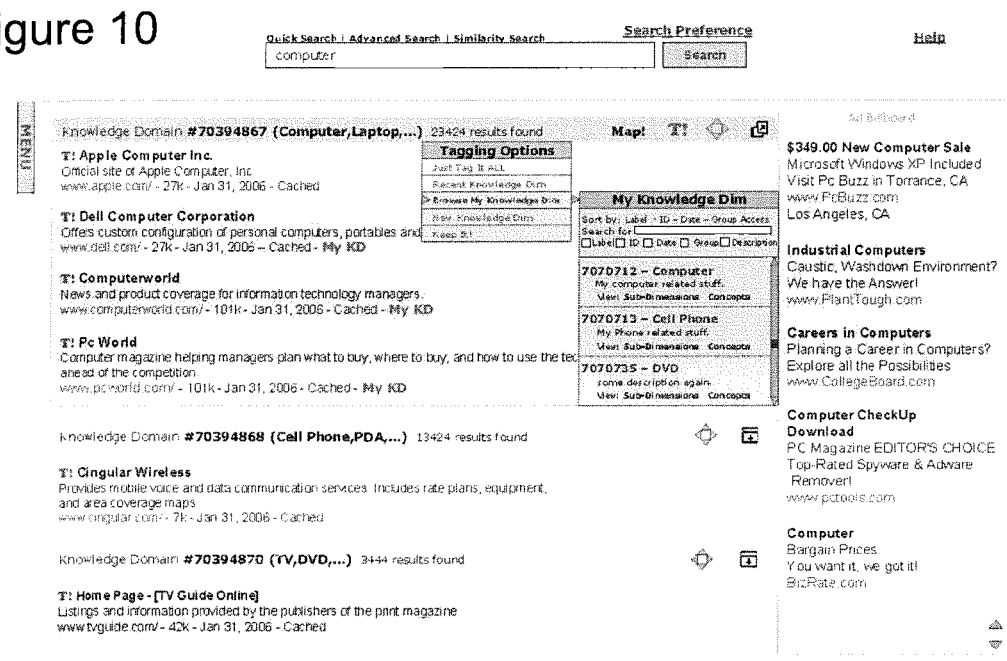
Figure 11:
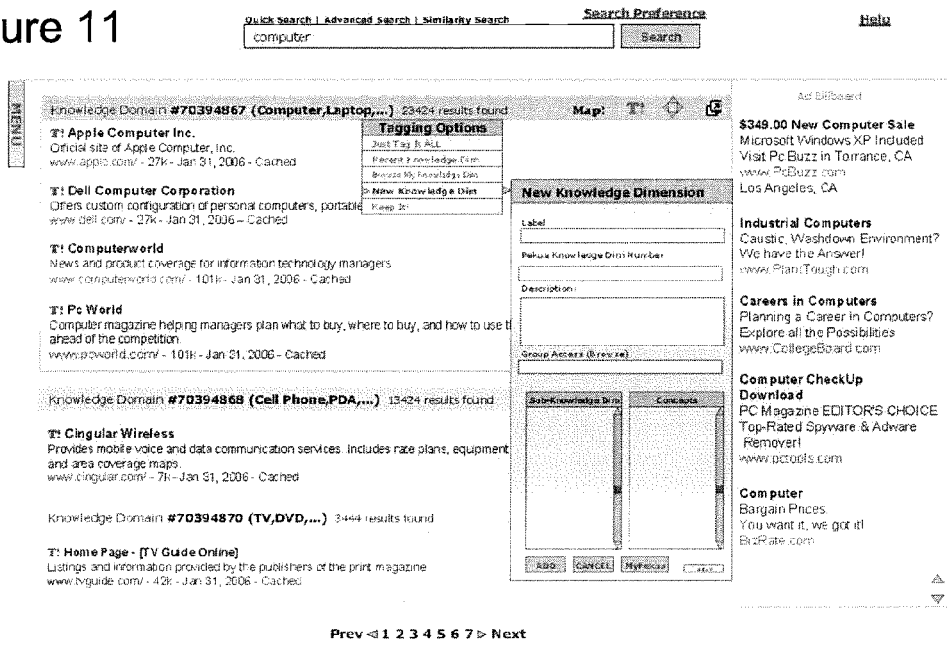

FIG. 7 illustrates a view of a user interface after a user has logged in and FIGS. 8-11 illustrate options and a process of tagging search results for personal use or sharing in the future. As illustrated in the figures, the user can browse and tag various concepts, KDs, sub-KDs and documents. These tags can be stored and the user may be given an option of labeling the tagged groups into KDMs. The user can also edit and manage the user's repository of KDMs.

Figure 12:
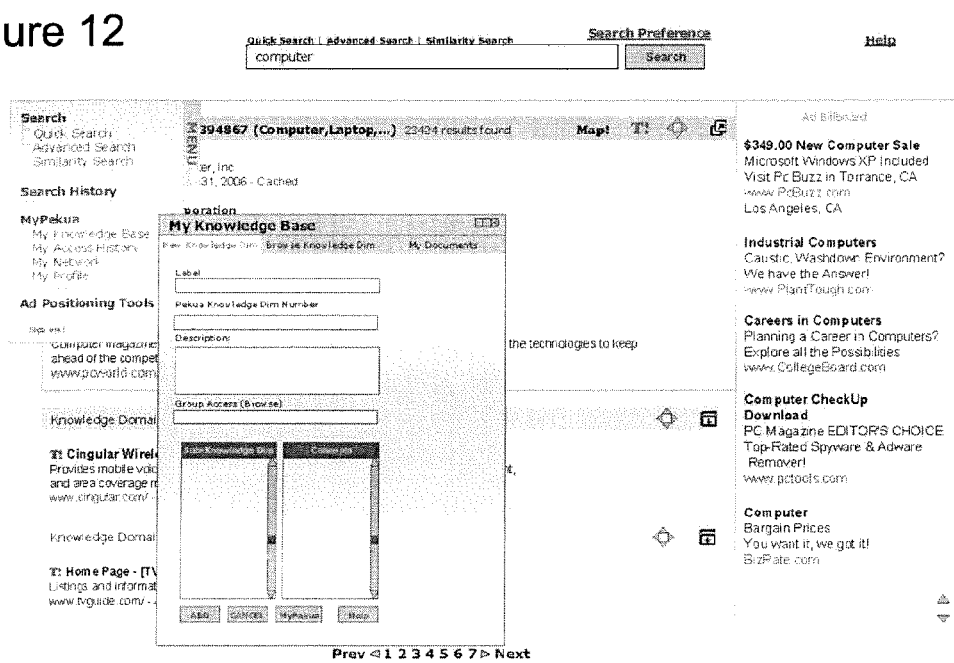
FIGS. 12-14 illustrate an example of options and processes of allowing a user to search, browse, and manage the user's own knowledge base.
Figure 13:
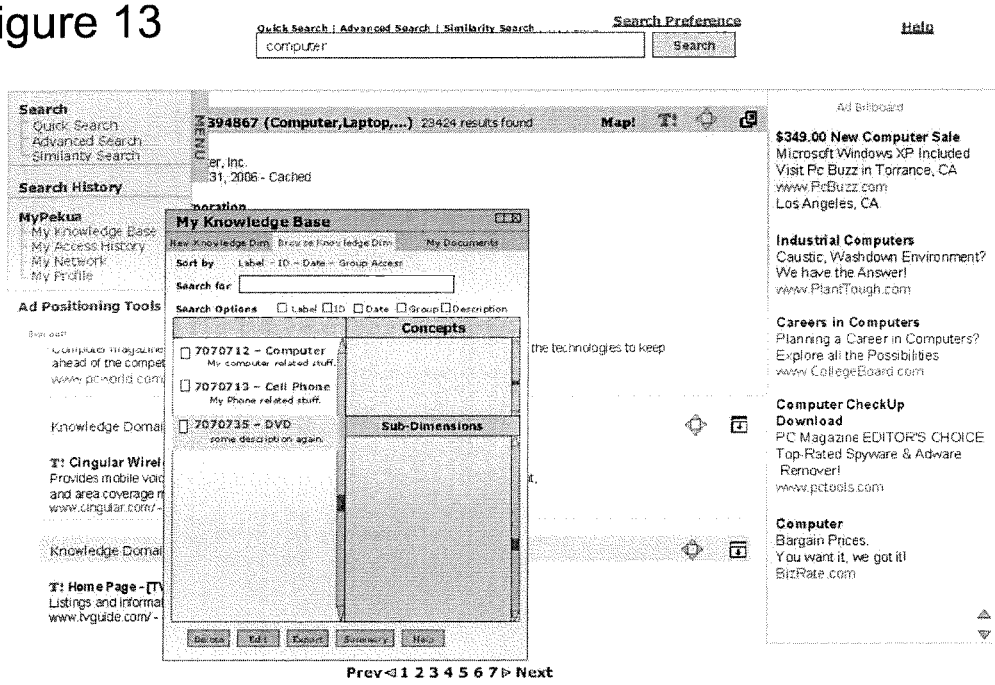
Figure 14:
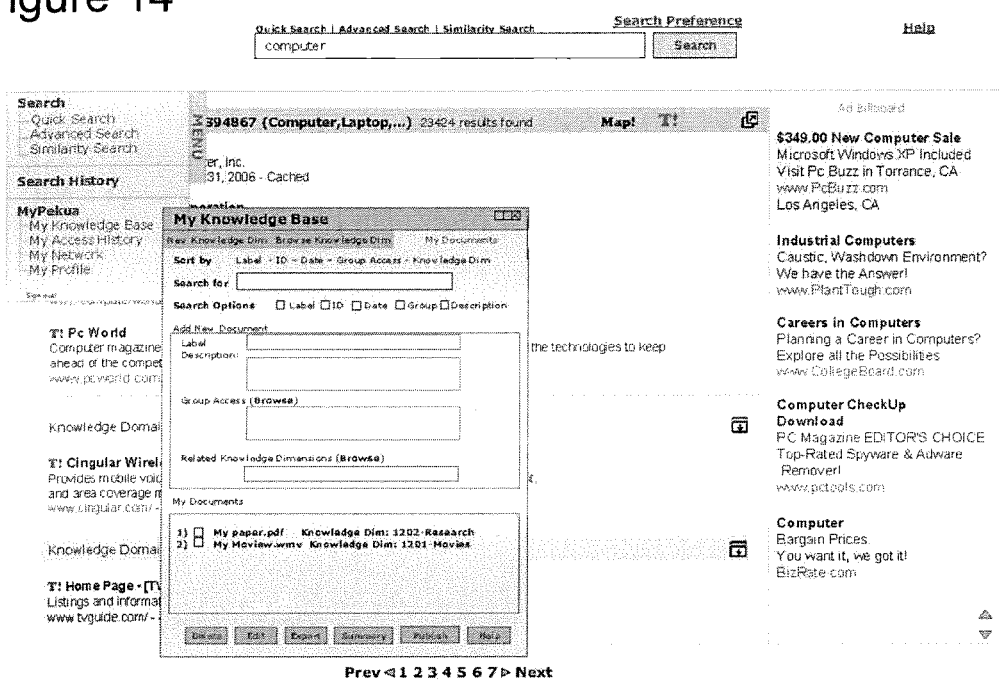
Figure 15:
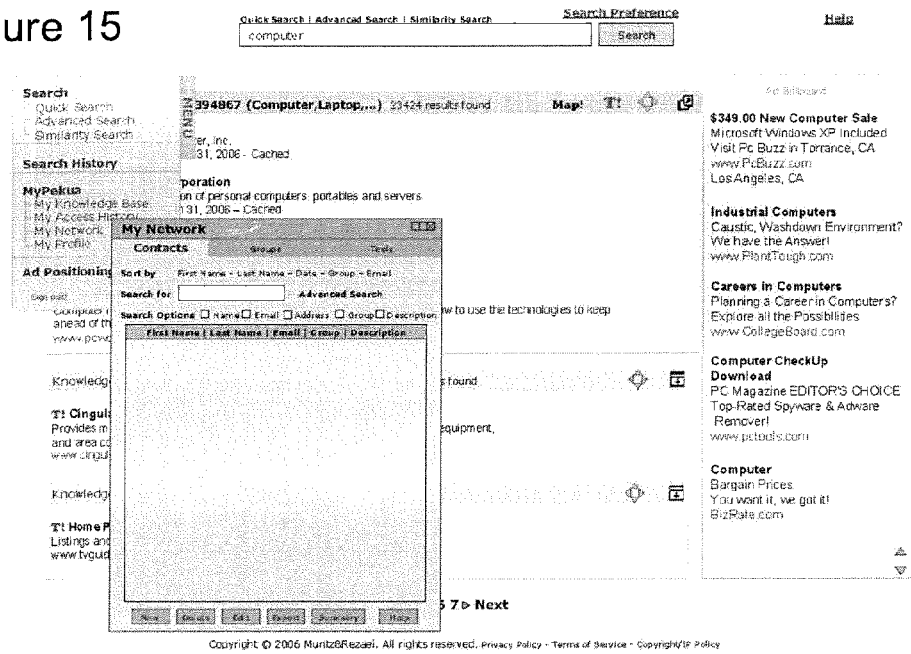
FIGS. 15-16 illustrate an example of options and process of allowing sharing of KDMs among selected social networks.
Figure 16:
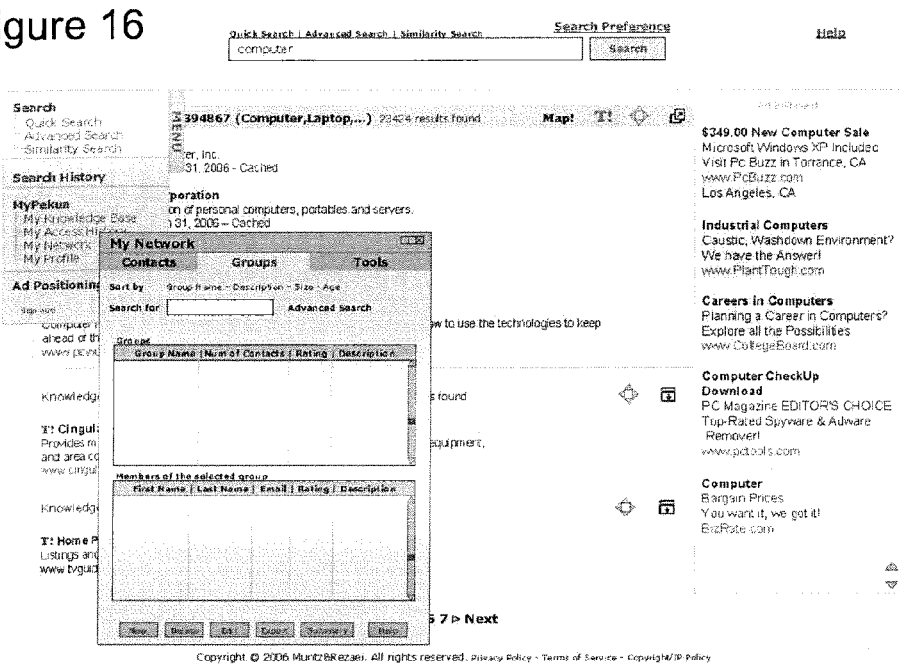
Figure 17:
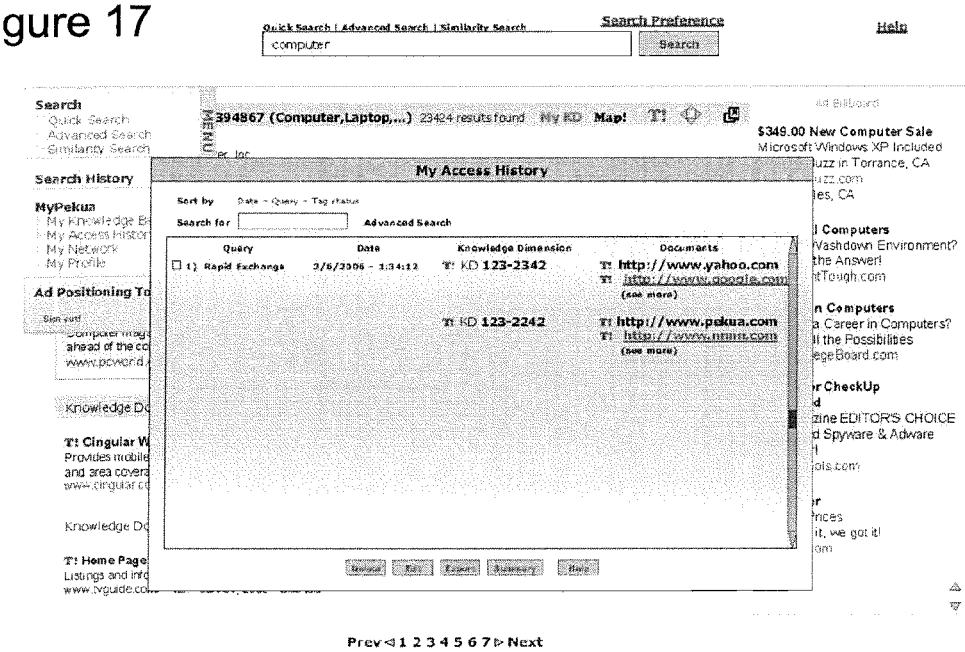
FIG. 17 illustrates an example of a history of queries and associated clicked-through KDs and documents.
Figure 18:
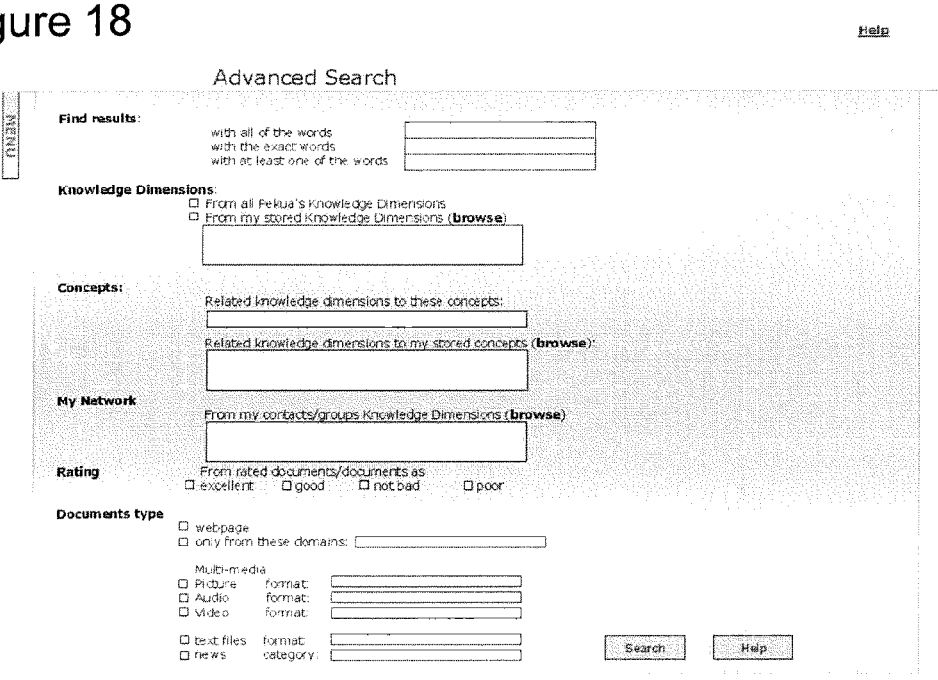
FIG. 18 illustrates an example of Advanced Search options.
Figures 19, 20:
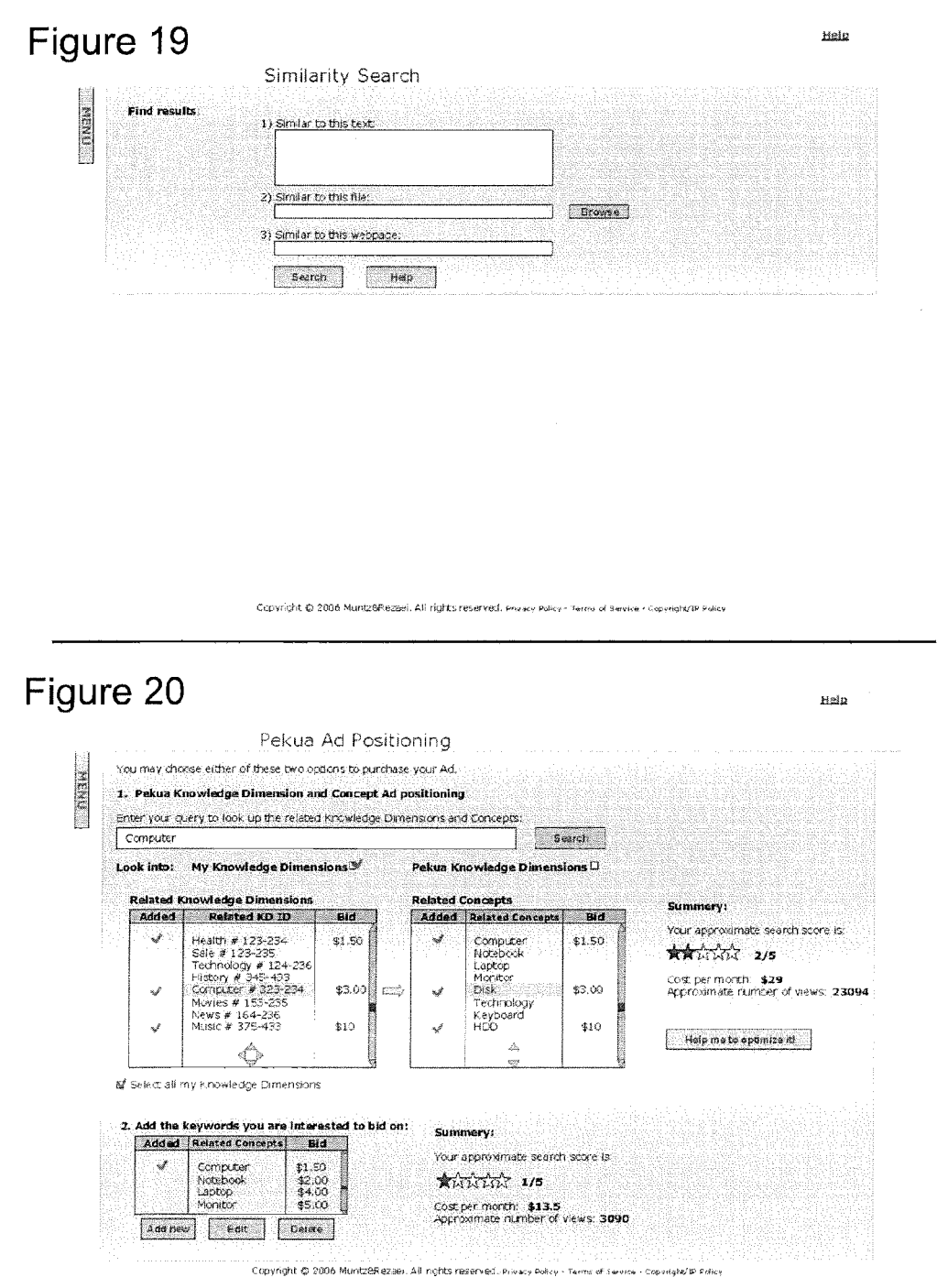

FIGS. 12-14 illustrate certain options and processes available to a user for searching, browsing, managing and sharing the user KDMs in certain embodiments of the invention. FIGS. 15 and 16 illustrate a feature of the interface that allows sharing of KDMs among social groups to which the user belongs, and a feature enabling management of the user's social and professional contacts. FIG. 17 illustrates a feature enabling tracking of a user search history to generate a search trace. Each search trace can be then tagged, stored, and shared. FIG. 18 illustrates an interface feature to perform advanced search. The advanced search allows the user to search using concepts, KDs and KDMs. FIG. 19 illustrates an interface feature that allows similarity searches. In a similarity search the user can enter text, upload documents, or provide URLs, and the search engine will find results that are similar to the information content of the related sets of documents.

In certain embodiments, a navigation history may be maintained for users. The navigation history may comprise one or more search traces. The navigation history can be summarized and processed to identify and prioritize frequently followed search paths. A personal search history can be recorded for a user and maintained in a database or other repository. In one example, a user interface can record a selected number of queries, associated sequences of user navigation of KDs, concepts, and documents clicked/selected during the navigation process. The user can then choose to tag documents, concepts, KDs and knowledge dimension maps in the user's search history repository. The user may also use these navigation sequences to define personal KDs. In addition, such trace information can be used by the user to perform the search and get updated information at a later time.

Methods for Smart Advertisement

Certain embodiments of the invention permit advertisers to target and place advertisements in correct context with respect to both user intentions and documents being viewed. Certain embodiments of the invention provide systems and methods for advertisement of products and services most relevant to the search results currently viewed by the user. Knowledge-based advertisement systems may facilitate the association of products and services with knowledge dimensions and concepts that are inherent in the underlying knowledge search systems instead of using conventional methods that associate keywords to products and services. Thus, an advertiser can bid for concepts and KDs that best describe the products and services to be advertised rather than merely buying keywords. Since advertisers are typically unaware of all concepts and KDs inherent in an underlying unstructured database such as the Web, certain embodiments of the invention provide a suite of methodologies for advertisers to automatically generate a list of relevant concepts and KDs for which they can bid. For example, existing feeds comprising a set of key words purchased by an advertiser can be used to generate a list of concepts and KDs that best match the set of key words. The advertiser can then subscribe to concepts and KDs that are determined to be most relevant. In another example, a set of documents that describe the advertiser's products and services can be used to perform a similarity match for determining the most relevant concepts and KDs.

In certain embodiments, one or more web addresses ("URLs") of the advertiser can be used to perform a web informational-neighborhood search in order to determine the informational neighborhoods of the advertiser and derive concepts and KDs from these neighborhoods. The web informational-neighborhood search described in U.S. patent application Ser. No. 11/625,279 may be used to obtain such determination. In one example, the web informational neighborhood of the website "Best-Buy.com" may reveal all the key demography related to Best-Buy products and services, which can then be processed semantically to derive the set of most relevant concepts and KDs.

In certain embodiments, searching can be synchronized with user intent. A user can highlight particular KDs and sets of concepts while navigating the knowledge search system. In certain embodiments, an ad-billboard may be provided on the user interface that synchronizes the advertisements to the concepts and KDs highlighted by the user. The exact ordering of the advertisements in the billboard may be determined by the scores with which the advertisers' bids on concepts and KDs match those highlighted and selected by the user.

FIG. 20 illustrates a snapshot of a feature that can help advertisers to position their products and services. The agent can select KDs, concepts, and KDMs that are related to his products. The system can then evaluate the selections and provide feedback on the expected number of viewers of the advertisement, and expected number of viewers who will select or click the advertisement and the price per click bid for the advertisement. The system may additionally calculate an expected value and/or revenue generated by placement of the advertisement based on the price per click and expected number of clicks. In certain embodiments, user feedback may also be considered in determining which advertisement will be selected for placement.

Certain embodiments provide systems and methods of monetizing content most relevant to a user's selection of an advertisement. Certain embodiments provide a means for sharing revenue among content owners. For example, revenue can be shared among owners of content determined to be responsible, or responsible to some desired probability, for the user's selection of a particular advertisement. A billboard is typically synchronized with a set of concepts and KDs in the search results when a user clicks on an advertiser's link and the search system can track the KDs and concepts that the user was viewing at the time the advertisement link was selected by the user. Moreover, documents can be sorted according to relevancy to these selected KDs and concepts. In one example, revenue sharing can be accomplished by distributing a desired percentage of CPC revenue among all content owners whose documents are displayed and weighted by respective relevancy scores. In another example, sharing of a percentage of CPC revenue can be limited to the top five content owners. Various other such revenue sharing schemes are contemplated for overlaying on the knowledge search system and user's selection of the KDs.

In certain embodiments, systems and methods are provided for enrichment of search results by obtaining and incorporating user feedback. KDs and concepts can be tracked based on relevancy and the most relevant KDs and concepts can be identified. For example, the KDs and concepts that are most viewed by users can be given a higher relevancy score and displayed more prominently in the list of query results. Similarly, KDs defined by users and shared with others, can be statistically processed to define new KDs and concepts.

Certain embodiments facilitate the identification of concepts and KDs that are most related to an advertisement link selected or clicked by a user. Advertisements can be synchronized with KDs and concepts and the search system can accurately estimate the user's intentions. Documents that are most closely related to the underlying concepts will typically be the most relevant documents that are displayed on the page at the time of the click. Hence, a percentage of CPC revenues can be shared with the owners of these documents according to a weighting principle. The method by which relative weights are determined can vary according to the cost model considered.

In certain embodiments of the invention, search intentions of a user can be mapped to concepts inherent in documents and/or concepts that have been previously defined and tagged by the user. Consequently, the user may receive a set of relevant KDs instead of a long, linear list of documents which often have questionable relevance. Each KD can display, list or otherwise present relevant documents that are sorted according to their global and local relevance scores together with an associated set of concepts and sub-KDs. The concepts and sub-KDs presented in response to a query can then be explored further, allowing the user to perform flexible searches and to discover veritable knowledge via associations. The resulting learning process may be viewed as learning that is modeled as an exploration of information space and based on conceptual similarities in a manner that is consistent with certain models developed for human cognition. Moreover, certain embodiments of the invention support user-defined KDs and allow users to highlight concepts and documents that have personal meaning and relevancy. Additionally, users can share personal knowledge with other members of a social and professional network.

In certain embodiments, advertisers can utilize KDs and concepts to properly locate and target the products and services to be advertised. Query features may permit advertisers to find all KDs and concepts that are related to their products and services. An advertisement engine can assist the advertiser to target users who explore concepts and KDs related to products and services advertised by the advertisers. For example, anti-virus software vendors and drug manufacturers for viral infections can be differentiated and can maintain their own billboard spaces, removing artificial competitions created in current models of advertisement that use keywords.

In certain embodiments, the contents that most closely match a user's needs can be determined through accurate tracking of concepts and contexts explored by the user in one or more search processes. Tracking information can be used to judge the informational value of a content provider's content and to develop a means for reimbursing the content provider when the provider's content leads to the purchase of a related product or service. In particular, revenue generated when an advertisement link is clicked can be shared with a selected percentage of owners of documents that are most relevant to the user's needs and which culminate in the user deciding to explore the related product.

Certain embodiments provide systems and apparatus for visualizing, managing, monetizing, and personalizing knowledge search results on a user interface. Systems typically comprise a computing device that may be any available personal computer, PDA, cellular telephone, gaming console, media player or other computing platform. Typically the computing device can communicate with one or more servers using a network such as the Internet. Typically, the computing device includes a display and user input device or system and has access to storage for instructions and data. The computing device communicates using any suitable or available wired or wireless connection, including DSL, modem, Ethernet, WiFi, Cellular or wireless telephony-based system. The computing device is typically provisioned to support a graphical user interface. A browser or other application receives user queries and can interrogate web servers or initiate a search using one or more servers. Advertisers can connect to the network in similar fashion to the users. Advertisers may use a computing device as described and, in certain embodiments, may provide advertisements from a server. Advertisement submission may be automated and controlled by program, time, or events such as product releases, news items, time of year, sales activities and son on.

In certain embodiments, one or more servers receive advertisements and monitor user activity with regard to placed advertisements. The one or more servers can record billable transactions and provide reports to advertisers and content providers. The one or more servers may issue bills to advertisers and may distribute payments to content providers.

Additional Descriptions of Certain Aspects of the Invention

Certain embodiments of the invention provide a method for organizing a body of documents, comprising mapping a plurality of documents to a knowledge dimension, wherein each of the mapped documents is characterized by one or more concepts associated with the knowledge dimension, and wherein the one or more concepts are calculated from the content of the mapped documents, ordering the mapped documents based on relevance of the one or more concepts to the mapped documents, and providing an overall concept identifying the knowledge dimension. In certain of these embodiments, the mapping includes linking a combination of documents in the plurality of documents, each document in the combination of documents having at least one concept in common with the other documents in the combination. In certain of these embodiments, documents in the combination are linked based on relevance of the at least one concept. In certain of these embodiments, relevance is derived from an analysis of the document. In certain of these embodiments, documents in the combination are linked based on predefined structural links. In certain of these embodiments, the predefined structural links include URLs. Certain of these embodiments also comprise mapping one or more of the plurality of documents to a knowledge sub-dimension, wherein each of the one or more documents is characterized by a subset of the one or more concepts. In certain of these embodiments, the ordering includes arranging a plurality of knowledge sub-dimensions in an order determined by relevance of corresponding subsets of concepts to a selected concept. In certain of these embodiments, the selected concept is derived from a query. In certain of these embodiments, the ordering includes ranking documents within the knowledge sub-dimension based on relevance of each document in the knowledge sub-dimension to a selected concept, wherein the selected concept is derived from a query.

Certain embodiments provide a method for targeting advertisements in a search of knowledge dimensions, comprising mapping a plurality of documents to a knowledge dimension, each of the mapped documents being characterized by one or more concepts identified with the knowledge dimension, wherein the one or more concepts are calculated from the content of the mapped documents, selecting an advertisement with at least one of the one or more concepts, determining relevance of the at least one concept to the mapped documents, and providing the selected advertisement to a user when the at least one concept is determined to be relevant to the mapped documents. In certain of these embodiments, determining relevance includes ranking the one or more concepts and identifying a relevance percentile in which the at least one concept lies with respect to the other concepts. In certain of these embodiments, the knowledge dimension includes one or more knowledge sub-dimensions characterized by a subset of the one or more concepts identified with the knowledge dimension and further comprising associating the knowledge sub-dimension with combinations of the plurality of documents identified with at least one of the subset of concepts. In certain of these embodiments, the determining relevance includes arranging the one or more knowledge sub-dimensions in an order determined by the relevance of the subset of concepts to at least one concept, calculating relevance of the at least one concept to each document within a percentage of the highest ranked one or more knowledge sub-dimensions based, and providing the relevance of the at least one concept as a percentile of documents in which the at least one concept lies. In certain of these embodiments, the selecting includes receiving bids for the at least one concept, and selecting an advertisement associated with the highest received bid. In certain of these embodiments, the selecting is based on a combination of factors including a number of expected viewers of the advertisement, a cost-per-click associated with the advertisement and viewer feedback. Certain of these embodiments also comprise receiving payment from a provider of the selected advertisement subsequent to the step of providing the selected advertisement. Certain of these embodiments also comprise sharing a portion of the payment with one or more providers of the mapped documents. In certain of these embodiments, the one or more providers of mapped documents provide a percentage of the documents most relevant to the at least one concept.

Certain embodiments provide a method for monetizing content provided by a web search, comprising placing an advertisement responsive to identifying a concept in documents resulting from a search initiated by a user and responsive to selection of the advertisement by the user, identifying a monetary value due a provider of one of the documents based on the relevancy of the one document to the concept and the relevancy of the advertisement to the concept. Certain of these embodiments, also comprise identifying another monetary value due the provider upon selection by the user of an advertisement within the one document. In certain of these embodiments, the amount of the monetary value is based on the relevancy of the document to the advertisement. In certain of these embodiments, the amount of the monetary value is based on the relative locations of the advertisement and the document in a display of the results of the search. In certain of these embodiments, the documents are mapped to a common knowledge dimension, wherein each of the documents is characterized by one or more common concepts associated with the knowledge dimension, and wherein the one or more common concepts are calculated from the content of the documents. In certain of these embodiments, documents are ordered based on relevance of the one or more concepts to the mapped documents. In certain of these embodiments, the one or more common concepts include the identified concept.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A computer implemented method comprising:
providing a search system, the search system comprising a plurality of documents, a plurality of knowledge dimensions, each knowledge dimension comprising a plurality of documents, one or more knowledge dimension maps representing the plurality of knowledge dimensions, and a plurality of concepts, the plurality of knowledge dimensions being characterized by the plurality of concepts, and the plurality of concepts being based on the content of the plurality of documents in each knowledge dimension;
receiving a query of the search system from a user;
presenting search results to the user based on the query, the search results comprising at least a portion of one or more of the plurality of knowledge dimensions, the plurality of documents, the plurality of knowledge dimension maps and the plurality of concepts;
receiving a user selection of one or more of:
one or more knowledge dimensions;
one or more knowledge dimension maps;
one or more concepts; and
one or more documents, wherein the one or more knowledge dimensions, one or more knowledge dimension maps, one or more concepts, and one or more documents are presented in the search results;
creating a personalized knowledge dimension that is personalized to the user based on the user selection, wherein creating the personalized knowledge dimension comprises associating the one or more knowledge dimensions, one or more knowledge dimension maps, one or more concepts and one or more documents that are selected by the user with the user; and
storing a representation of the personalized knowledge dimension that is personalized to the user based on the user selection in the search system with the plurality of knowledge dimensions.

2. The method of claim 1, further comprising:
ordering the first plurality of documents based on relevance of the first one or more concepts to the first plurality of documents, and wherein the documents are presented to the user based on the ordering.

3. The method of claim 1, wherein the input received from the user is received based on the search results.

4. The method of claim 1, wherein the query comprises a search term.

5. The method of claim 1, wherein the query comprises a document.

6. The method of claim 1, wherein the search results are displayed as a sorted list of a plurality of knowledge dimensions.

7. The method of claim 1, further comprising embedding tags in the one or more of: the one or more knowledge dimensions, the one or more knowledge dimension maps, one or more documents, and one or more concepts.

8. The method of claim 1, further comprising allowing the user to define a plurality of personal concepts based on a repository of documents associated with the user, and associating the plurality of personal concepts with the personalized knowledge dimension.

9. The method of claim 8, further comprising associating the plurality of personal concepts with a plurality of personalized knowledge dimensions, each personalized knowledge dimension associated with one of the personal concepts.

10. The method of claim 1, further comprising allowing the user to browse the personalized knowledge dimension using the search system.

11. The method of claim 1, further comprising allowing the user to query the personalized knowledge dimension using the search system.

12. The method of claim 1, further comprising allowing the user to share the personalized knowledge dimension with members of a network associated with the user using the search system.

13. The method of claim 1, further comprising:
tracking a search history of the user;
generating a search trace based on the search history;
receiving input from the user, the input corresponding to the user tagging the search trace;
storing the tagged search trace.

14. The method of claim 1, further comprising:
mapping a first plurality of documents to a first knowledge dimension.

15. The method of claim 14, wherein the mapping includes linking a combination of documents in the first plurality of documents, each document in the combination of documents having at least one concept in common with the other documents in the combination.

16. The method of claim 15, wherein documents in the combination are linked based on relevance of the at least one concept.

17. The method of claim 16, wherein relevance is derived from an analysis of the document.

18. The method of claim 15, wherein documents in the combination are linked based on predefined structural links.

19. The method of claim 18, wherein the predefined structural links include URLs.

20. The method of claim 14, further comprising mapping one or more of the first plurality of documents to a knowledge sub-dimension, wherein each of the one or more documents is characterized by a subset of the one or more concepts.

21. The method of claim 20, wherein the ordering includes arranging a plurality of knowledge sub-dimensions in an order determined by relevance of corresponding subsets of concepts to a selected concept.

22. The method of claim 21, wherein the selected concept is derived from a query of a particular user.

23. The method of claim 20, wherein the ordering includes ranking documents within the knowledge sub-dimension based on relevance of each document in the knowledge sub-dimension to a selected concept, wherein the selected concept is derived from a query of a particular user.

24. The method of claim 14, wherein the first plurality of documents are mapped to a plurality of overlapping knowledge dimensions, the plurality of overlapping knowledge dimensions including the first knowledge dimension.

25. The method of claim 14, wherein the query comprises a selection of the first knowledge dimension from a knowledge dimension map. using the search system.

26. The method of claim 1, wherein the personalized knowledge dimension at least partially overlaps at least one of the plurality of knowledge dimensions.

27. The method of claim 1, wherein at least two of the plurality of knowledge dimensions overlap.

28. The method of claim 1, wherein the plurality of knowledge dimensions have a hierarchical structure.

29. The method of claim 1, wherein at least one of the plurality of knowledge dimensions comprises a plurality of sub-knowledge dimensions.

* * * * *